C. F. WILLNER.
SPRING WHEEL.
APPLICATION FILED APR. 17, 1913.
1,084,515.
Patented Jan. 13, 1914.
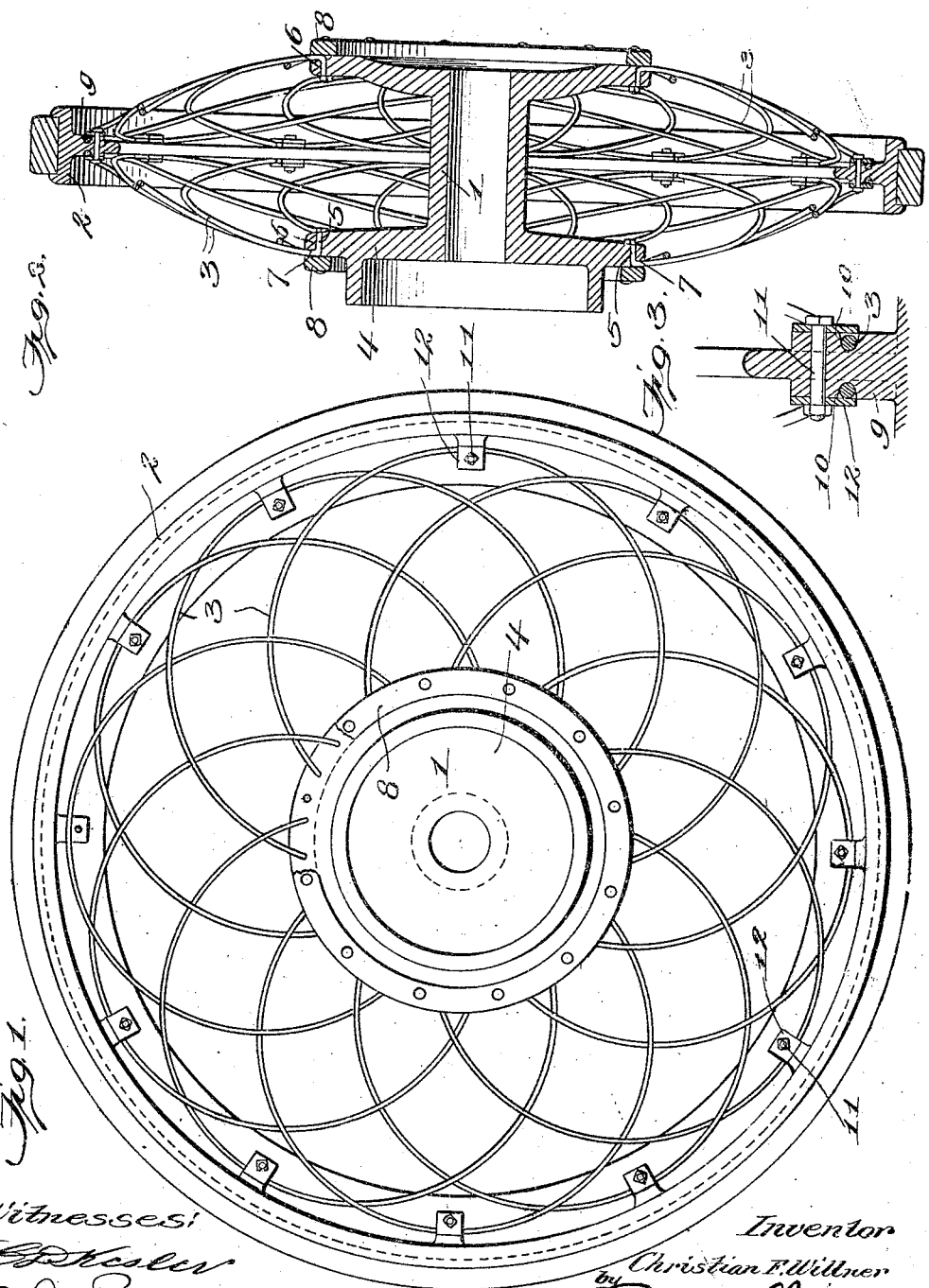

UNITED STATES PATENT OFFICE.

CHRISTIAN F. WILLNER, OF KANSAS CITY, KANSAS.

SPRING-WHEEL.

1,084,515.  Specification of Letters Patent. Patented Jan. 13, 1914.

Application filed April 17, 1913. Serial No. 761,832.

*To all whom it may concern:*

Be it known that I, CHRISTIAN F. WILLNER, a citizen of the United States, residing at Kansas City, in the county of Wyandotte and State of Kansas, have invented new and useful Improvements in Spring-Wheels, of which the following is a specification.

This invention relates to improvements in spring wheels, and it proposes a construction which is made up of a hub, a rim, and spring spokes intermediate the hub and the rim, the invention consisting in the novel construction and arrangement of the spokes whereby the rim is resiliently supported and is effectively and symmetrically braced in the plane of the hub, whereby adequate provision for the uniform support of the load is secured without interference with the resiliency of the wheel; whereby the spokes are intrinsically strong and the wheel is not liable to derangement, and whereby the spokes may be easily and quickly removed and replaced whenever the occasion may arise.

An embodiment of the invention is illustrated in the accompanying drawings, wherein:

Figure 1 is a side elevation of a wheel in which the features of the invention are incorporated; Fig. 2 is a cross sectional view thereof; and Fig. 3 is a detail cross sectional view showing the connection between the spokes and felly.

Similar characters of reference designate corresponding parts throughout the several views.

The wheel includes the hub 1, the rim or felly 2, and the spokes 3. The hub 1 includes side flanges 4, an important characteristic of which is that they are of relatively large diameter, *e. g.* from one third to one half the diameter of the wheel.

The spokes 3 are in their normal condition of generally annular outline, and have an extent approximately two-thirds of a circle. The ends of the spokes are sharply inturned at 5 for engagement in openings 6 in the flanges 4 adjacent the perimeter of said flanges. The openings 6 are in line with grooves 7 in the outer faces of said flanges and which extend to the perimeter thereof and the portions of the spokes 3 adjacent the inturned ends 5 seat in said grooves, and are thereby flush with the outer faces of the flanges 4. It is preferred to positively secure the inner ends of the spokes in relation to the flanges 4 and for this purpose, retaining rings 8 are preferably employed which are secured by screws or otherwise to the flanges 4, engaging over the inner end portions of the spokes 3 and thereby preventing any disengagement of the inner ends of said spokes from said flanges.

The spokes 3 are secured centrally thereof to the rim or felly 2, the latter having a central inner circumferential flange 9 to which said spokes are attached. The flange 9 is provided in its side faces with curved grooves 10 generally similar to the grooves 7 and the attached portions of the spokes 3 engage in said grooves 10, being flush with the side faces of the flange 9, as indicated in Fig. 3. For the purpose of positively attaching the spokes 3 to the flange 9, bolt and nut fastenings 11 and washers 12 are employed, the washers fitting over those portions of the spokes which engage in the grooves 10 at opposite sides of the flange 9.

The spokes 3 are preferably arranged in line with one another at opposite sides of the wheel, and are preferably curved not only throughout their lineal extent, as described, but also transversely, as shown in Fig. 2, so that the alining spokes of each pair form a transverse spring arch of generally Gothic outline.

A further characteristic feature of arrangement is that each spoke projects across the spokes adjacent thereto at the same side of the wheel, this relation permitting the use of a relatively large number of spokes at each side of the wheel, without entailing, for any given number of spokes, any reduction in their size or degree of curvature.

The spokes are intrinsically strong and are so associated with the hub and the felly as to greatly promote the strength and durability of the wheel as a whole. The relation of the spokes assures that the felly will be efficiently and symmetrically braced in the plane of the hub. The form of the spokes assures that the wheel shall have the requisite resiliency and the relatively close association of the spokes assures that the resilient support of the felly shall be uniform throughout its extent. Adequate strength and provision for the efficient support of the load is secured, not only by the form of the spokes, but by the fact that their inner ends, located symmetrically with relation to their outer attached central portions, are secured to hub flanges of relatively large diameter and are thus substantially spaced from the center of the wheel. The manner of securing the spokes to the hub and to the felly secures strength in the organized wheel and at the same time provides for the ready removal or replacement of any of the spokes should the occasion require.

Having fully described my invention, I claim:

1. In a spring wheel, a hub having side flanges of a diameter approximately a third of the diameter of the wheel, a felly, and resilient spokes of generally annular form and of approximately two-thirds of a circle in extent, the spokes being arranged symmetrically and in alining relation at opposite sides of the wheel and having their inner ends joined to the hub flange at the same side of the wheel and near the perimeter of said flange and having their centers joined to the felly each spoke projecting across the spokes adjacent thereto at the same side of the wheel.

2. In a spring wheel, a hub having side flanges of a diameter approximately a third of the diameter of the wheel, a felly, and resilient spokes of generally annular form and of approximately two-thirds of a circle in extent, the spokes being symmetrically arranged at each side of the wheel and having their inner ends joined to the hub flange at the same side of the wheel and near the perimeter of said flange and having their centers joined to the felly, the spokes having a transverse curvature whereby each pair of oppositely located spokes presents a transverse spring arch of generally Gothic outline.

3. In a spring wheel a hub having side flanges of a diameter approximately a third of the diameter of the wheel, a felly, wire spokes of generally annular form and of approximately two-thirds of a circle in extent, the spokes being symmetrically arranged at each side of the wheel and having their inner ends joined to the hub flange at the same side of the wheel and near the perimeter of said flange and having their centers joined to the felly, the spokes at their inner ends having inturned portions and the hub flanges having openings for said inturned portions and grooves adjoining said openings and in which the inner end portions of the spokes engage, retaining rings secured on said hub flanges and overlying the inner end portions of the spokes, the felly having a central inner circumferential flange provided with grooves in its side faces to receive the central portions of the spokes, washers fitting over the central portions of the spokes and fastenings to secure the washers to the flange of the felly.

4. In a spring wheel, a hub having side flanges of a diameter approximately a third of the diameter of the wheel, a felly, wire spokes of generally annular form and of approximately two-thirds of a circle in extent, the spokes being symmetrically arranged at each side of the wheel and having their inner ends joined to the hub flange at the same side of the wheel and near the perimeter of said flange and having their centers joined to the felly, the spokes at their inner ends having inturned portions and the hub flanges having openings for said inturned portions and grooves adjoining said openings and in which the inner end portions of the spokes engage, retaining means secured on said hub flanges and overlying the inner end portions of the spokes, the felly having a central inner circumferential flange provided with grooves in its side faces to receive the central portions of the spokes, the spokes being arranged in alining relation at opposite sides of the wheel, and a fastening bolt for each pair of washers at opposite sides of the flange of the felly.

In testimony whereof I have hereunto set my hand in presence of two subscribing witnesses.

CHRISTIAN F. WILLNER.

Witnesses:
GROVER BOWERS,
S. F. FINK.